United States Patent Office 3,147,236
Patented Sept. 1, 1964

3,147,236
EPOXY MONOMERS AND RESINS THEREOF
William S. Port, Norristown, and Frank Scholnick, Elkins Park, Pa., assignors to the United States of America as represented by the Secretary of Agriculture
No Drawing. Filed Mar. 1, 1961, Ser. No. 92,717
5 Claims. (Cl. 260—78.4)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to non-terminal epoxy resins prepared from a novel group of epoxy monomers.

Commercially available intermediates for thermosetting resins, useful in molding compositions for encapsulating delicate parts, making shaped objects, and the like, are predominately glycidyl derivatives or contain terminal epoxide groups. Processes have been developed in which epoxy ether resins and compositions containing these resins are mixed with curing (hardening) agents and, usually with slight heating, allowed to stand until a hard, cured resin is produced. In contrast to the foregoing type of epoxy resin, compounds containing non-terminal epoxides, many of which have been known for many years, are little used because these compounds are less reactive and because the cured resins derived therefrom have low heat distortion temperatures, low tensile strengths, and low moduli of elasticity. A high heat distortion temperature is an important property for many of the uses to which one may wish to apply these resins.

In U.S. Patent No. 2,975,149 it is demonstrated that non-terminal epoxides such as epoxidized vegetable oils, epoxidized animal oils, and epoxidation products of esters prepared from unsaturated long carbon chain fatty acids and mono-, di-, and polyhydric alcohols, produced useful resins when heated with a cyclic anhydride in the presence of a tertiary amine. In these non-terminal epoxy resins it will be noted that the heat distortion temperature of the resin product varies directly with the number of epoxy functions in the monomer in both the epoxidized oleate and epoxidized linoleate series, and that, in general, a considerable number of epoxy functions in the monomer is necessary to provide a resin with relatively high heat distortion temperature.

It has now been discovered that monomers having the same or a lesser number of epoxy functions in the molecule than those heretofore disclosed, but having an epoxy function symmetrically disposed between the epoxy functions derived from the fatty chain moieties results in resins with unusually high heat distortion temperatures.

In general, according to the present invention a compound of the general formula

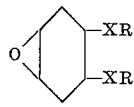

wherein X is

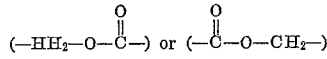

and R is

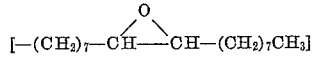

or

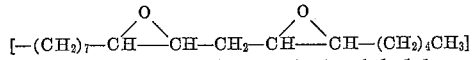

is obtained by preparing the tetrahydrophthalyl esters of oleic and linoleic acids and the oleyl and linoleyl esters of tetrahydrophthalic acid and then epoxidizing these esters to give the monomer having an epoxy function symmetrically disposed between the epoxy functions derived from the fatty chain moieties. The monomeric material is then combined with an amount ranging from an equimolar to ±20% of an equimolar equivalent of a cyclic carboxylic anhydride and with about 0.1 to 4% by weight of final mixture of a tertiary amine such as benzyldimethylamine, β-dimethylaminopropionitrile and triamylamine, and the mixture heated to effect polymerization.

The hexahydrophthalyl esters of oleic and linoleic acids and the oleyl and linoleyl esters of hexahydrophthalic acid were also prepared, epoxidized and polymerized to resins, thus providing a direct comparison of the importance of the extra epoxy function.

The general procedure used to prepare the esters was to reflux a toluene solution containing the alcohol and acid with a catalytic amount of 2-naphthalenesulfonic acid monohydrate. A 5% molar excess of the monofunctional alcohol or acid was used. The amount of catalyst added was 1 mole percent of the difunctional alcohol or acid. The reaction mixture was refluxed under nitrogen in a flask equipped with a water trapping device for the azeotropic removal of water. After all the water of the reaction was removed, petroleum ether (B.P. 63–70° C.) was added, and the mixture washed successively with water, dilute (50%) ethanol containing potassium hydroxide, and more water until neutral. The neutral product was dried over anhydrous magnesium or calcium sulfate and the solvent removed under reduced pressure.

The dilinoleoyl ester of hexahydrophthalyl alcohol was prepared by an exception to the general procedure. In this instance 24.4 g. (0.81 mole) of linoleoyl chloride was added over a period of 30 minutes to a solution of 5.8 g. (0.4 mole) of hexahydrophthalyl alcohol in 50 ml. of pyridine, keeping the temperature below 25° C. The mixture was stirred one hour at room temperature and one hour at 36–42° C. The solution was cooled, poured into water and extracted with chloroform. The latter was washed with 1% sodium hydroxide, then with water, dried, and the solvent removed to give 25.2 g. (94% yield) of product.

A list of the compounds prepared, yield of crude product, and purity of product as indicated by iodine number is presented in Table I.

TABLE I

*Esters Prepared for Subsequent Epoxidation*

| Example No. | Ester | Crude yield, percent | Iodine number Found | Iodine number Calculated |
|---|---|---|---|---|
| 1 | Dioleoyl ester of tetrahydrophthalyl alcohol. | 50 | 112.8 | 113.4 |
| 2 | Dilinoleoyl ester of tetrahydrophthalyl alcohol. | 55 | 187.5 | 190.2 |
| 3 | Dioleyl tetrahydrophtahlate | 78 | 111.2 | 113.5 |
| 4 | Dilinoleyl tetrahydrophthalate | 100 | 179.9 | 190.3 |
| 5 | Dioleoyl ester of hexahydrophthalyl alcohol. | 60 | 73.5 | 75.4 |
| 6 | Dilinoleoyl ester of hexahydrophthalyl alcohol. | 94 | 151.0 | 152.0 |
| 7 | Dioleyl hexahydrophthalate | 86 | 76.4 | 75.4 |
| 8 | Dilinoleyl hexahydrophthalate | 100 | 145.6 | 151.7 |

The epoxidation of the esters is exemplified in the following examples.

EXAMPLE 9.—PREPARATION OF BIS-(9,10-EPOXYOCTADECYL) 4,5-EPOXYHEXAHYDROPHTHALATE

Fifty grams (0.075 mole) of dioleyl tetrahydrophthalate, iodine number 111.2, was dissolved in 300 ml. chloroform, and a solution of 72.4 g. of 33% peracetic acid and 3.6 g. of sodium acetate trihydrate was added slowly with stirring over a period of 45 minutes. The temperature was kept below 30° C. After 2½ hr., the mixture was washed successively with 200 ml. water, two 100 ml. portions of 2% sodium bicarbonate, and finally with water until neutral. After the solution had been dried and the solvent distilled off, 47.1 g. of crude epoxide was obtained, 87.4% of the thetoretical amount, epoxide content (found) 6.30%, (calculated) 6.68%.

TABLE II
*Epoxide Monomers*

| Example No. | Example No. of precursor | Epoxidation products | Crude yield | Crude | Epoxy content recryst.* | Calc. |
|---|---|---|---|---|---|---|
| 10 | 1 | 4,5-epoxyhexahydrophthalyl bis-(9,10-epoxystearate). | 90 | 6.30 | 6.55 | 6.68 |
| 11 | 2 | 4,5-epoxyhexahydrophthalyl bis-(9,10;12,13-diepoxystearate). | 100 | 9.24 | 9.68 | 10.71 |
| 9 | 3 | Bis-(9,10-epoxyoctadecyl) 4,5-epoxyhexahydrophthalate. | 87 | 6.30 | -------- | 6.68 |
| 12 | 4 | Bis-(9,10;12,13-diepoxyoctadecyl) 4,5-epoxyhexahydrophthalate. | 83 | 8.82 | 9.64 | 10.71 |
| 13 | 5 | Hexahydrophthalyl bis-(9,10-epoxystearate). | 80 | 4.34 | 4.36 | 4.54 |
| 14 | 6 | Hexahydrophthalyl bis-(9,10;12,13-diepoxystearate). | 85 | 7.86 | 8.04 | 8.73 |
| 15 | 7 | Bis-(9,10-epoxyoctadecyl) hexahydrophthalate. | 88 | 4.39 | 4.47 | 4.54 |
| 16 | 8 | Bis-(9,10;12,13-diepoxyoctadecyl) hexahydrophthalate. | 82 | 7.60 | 7.85 | 8.73 |

*Examples 10 and 11 recrystallized from petroleum ether, (B.P. 30–60° C.), Example 12 from ethyl ether, and Examples 13 to 16 from acetone.

EXAMPLES 10 TO 16

An epoxidation procedure similar to that described in Example 9 was applied to the other esters of Examples 1 to 8. In most instances the purity of the epoxidation product was improved by recrystallization from a suitable solvent, as indicated in Table II.

In the preferred procedure for preparation of resins, the polyepoxide and the cyclic carboxylic anhydride are combined on the basis of approximately equivalent weights, that is, one mole anhydride to one epoxide equivalent, although it has been demonstrated that a variation of ±20% in this formulation did not appreciably change the heat distortion temperature of the resin products.

Practical time-temperature relationships for reaction of ingredients is readily determined by preliminary experimentation. Thus, in a typical example, an initial temperature of 150° C., followed by curing at 120° C. for about 24 hours gave resins whose heat distortion temperatures did not appreciably improve upon further curing. When lower temperatures are used the reaction time must be increased to achieve a resin with about the same physical properties.

The tertiary amine was added at the level of 2.5% by weight of the resin ingredients to insure optimum reaction, but a range of levels of addition of from about 0.1 to 4% of tertiary amine is applicable to the process.

In a typical procedure, equivalent weights of polyepoxide and phthalic anhydride were heated at 150° C. and thoroughly mixed. The tertiary amine, usually benzyldimethylamine, was added and mixing continued. Under these conditions, gelatin usually occurred in less than an hour, in several instances in only a matter of minutes. The reactants were maintained at about 150° C. for three hours after gelation occurred, then heated at 120° C. for about 24 hours. Samples were submitted for physical testing at this time and also after 16 hours additional cure at 120° C. The results are presented in Table III.

The importance of the extra, symmetrically located, epoxy function in enhancing the heat distortion temperature of a resin is apparent from inspection of Table III. Comparison of resins prepared from monomers of Examples 9–12 with those prepared from monomers of Examples 13–16 shows an average increase in heat distortion temperature of almost 50° C. Since the monomers are otherwise structurally comparable, as when comparing Example 10 with Example 13, Example 11 with Example 14, etc., all the increase is attributable to the one additional epoxy function in the monomers of Examples 9–12.

Furthermore, the proper distribution of epoxide functionality permits the use of monomers with lower epoxy content to obtain resins with high heat distortion temperatures. Thus, in the aforesaid Patent No. 2,975,149, a resin having a heat distortion temperature of 123° C. was obtained from phthalic anhydride and the epoxidized ester of dipentaerythritol hexalinoleate having an average of 10.76 epoxy groups. In the present application, a heat distortion temperature of 150° C. is obtained in Example 11 from an epoxy monomer having an average of 4.5 epoxide groups. Thus, the importance of the distribution of epoxide functionality has been demonstrated.

TABLE III
*Preparation and Properties of Resins*

| Monomer from Example No. | Structure of epoxide monomer | Epoxide purity, percent | Gel time, min. | Heat distortion temperature After original cure, °C. | After 16 hrs. additional cure, °C. |
|---|---|---|---|---|---|
| 10 | (structure with –CH₂OC(O)–R′, –CH₂OC(O)–R′) | 98 | 40 | 50 | 60 |
| 11 | (structure with –CH₂OC(O)–R″, –CH₂OC(O)–R″) | 90 | 3 | 150 | -------- |
| 9 | (structure with –COOCH₂R′, –COOCH₂R′) | 95 | 31 | 65 | 75 |
| 12 | (structure with –COOCH₂R″, –COOCH₂R″) | 90 | 3 | 80 | 95 |
| 13 | (structure with –CH₂OC(O)–R′, –CH₂OC(O)–R′) | 96 | 115 | –5 | -------- |
| 14 | (structure with –CH₂OC(O)R″, –CH₂OC(O)R″) | 92 | 11 | 75 | 80 |
| 15 | (structure with –COOCH₂R′, –COOCH₂R′) | 98 | 49 | 10 | -------- |
| 16 | (structure with –COOCH₂R″, –COOCH₂R″) | 90 | 5 | 70 | 75 |

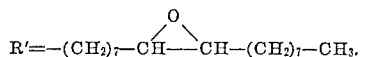

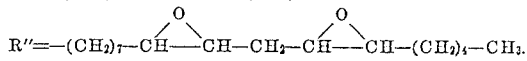

We claim:
1. A process for the preparation of an epoxy resin comprising heating a mixture containing a compound of the general formula

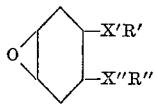

wherein $X'=X''$ and $X'$ is selected from the group consisting of

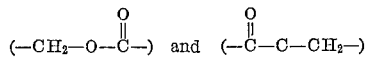

$R'=R''$ and $R'$ is selected from the group consisting of

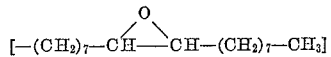

and

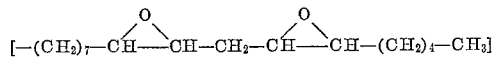

phthalic anhydride, and benzyldimethylamine to effect polymerization, each of said compound and said phthalic anhydride being present in said mixture in an amount ranging from an equivalence to the epoxide content to ±20% of equivalence, benzyldimethylamine being present in said mixture in about 0.1 to 4% by weight.

2. The process of claim 1 in which the compound of the general formula is 4,5-epoxyhexahydrophthalyl bis-(9,10-epoxystearate).

3. The process of claim 1 in which the compound of the general formula is 4,5-epoxyhexahydrophthalyl bis-(9,10;12,13-diepoxystearate).

4. The process of claim 1 in which the compound of the general formula is bis-(9,10-epoxyoctadecyl)4,5-epoxyhexahydrophthalate.

5. The process of claim 1 in which the compound of the general formula is bis-(9,10;12,13-diepoxyoctadecyl) 4,5-epoxyhexahydrophthalate.

References Cited in the file of this patent
UNITED STATES PATENTS

| | | |
|---|---|---|
| 2,750,395 | Phillips et al. | June 12, 1956 |
| 2,761,870 | Payne et al. | Sept. 4, 1956 |
| 2,786,066 | Frostick et al. | Mar. 19, 1957 |
| 2,786,067 | Frostick et al. | Mar. 19, 1957 |
| 2,890,210 | Phillips et al. | June 9, 1959 |
| 2,949,441 | Newey | Aug. 16, 1960 |
| 2,999,865 | Phillips et al. | Sept. 12, 1961 |
| 3,000,848 | McGary et al. | Sept. 19, 1961 |
| 3,031,434 | Radlove | Apr. 24, 1962 |